Feb. 26, 1963   W. E. BAKER   3,078,876
PRESSURE RESPONSIVE ACTUATOR AND METHOD OF MAKING THE SAME
Filed Nov. 16, 1960   2 Sheets-Sheet 1

*INVENTOR.*
WILLIAM E. BAKER
BY
Kenway, Jenney & Hildreth
ATTORNEYS

Feb. 26, 1963 W. E. BAKER 3,078,876
PRESSURE RESPONSIVE ACTUATOR AND METHOD OF MAKING THE SAME
Filed Nov. 16, 1960 2 Sheets-Sheet 2

INVENTOR.
WILLIAM E. BAKER
BY
ATTORNEYS

United States Patent Office 3,078,876
Patented Feb. 26, 1963

3,078,876
PRESSURE RESPONSIVE ACTUATOR AND
METHOD OF MAKING THE SAME
William E. Baker, Wellesley, Mass., assignor to Standard-
Thomson Corporation, Waltham, Mass., a corporation
of Delaware
Filed Nov. 16, 1960, Ser. No. 69,584
14 Claims. (Cl. 137—788)

This invention relates to pressure responsive actuating devices, and more particularly, to pressure responsive actuating devices of the type such as shown in my co-pending application, Serial No. 847,238, filed October 9, 1959.

The type of pressure responsive actuator with which this invention is particularly concerned generally comprises a housing having a recess in which is molded a resiliently deformable force transmitting member. The inner end of the force transmitting member is spaced from the inner end of the recess in which it is molded to provide a chamber into which pressurized fluid may be introduced to act upon the force transmitting member. The force transmitting member is further provided with a recess or cavity in which is slidably received an actuating member or pin. As is well known, the force exerted on the force transmitting member by the pressurized fluid will cause the actuating member to move outwardly of the cavity in the force transmitting member. This movement of the actuating member may be used in a variety of ways to actuate external devices, such as electrical switches, etc. A known method for manufacturing such a pressure responsive device comprises pressure molding the elastomeric force transmitting member in the recess in the housing. Inasmuch as it is desired to space the inner end of the force transmitting member from the bottom of the recess in which is molded, it is necessary to provide a support for the inner end of the force transmitting member during the molding step. Inasmuch as the molding of the force transmitting member is accomplished by considerable pressure, a rigid support for the inner end of the force transmitting member must be provided. This support, however, must be removed subsequent to the molding operation in order to obtain proper performance of the device. This requirement for support of the force transmitting member during the molding process has presented manufacturing problems, the solution of which has heretofore materially increased the complexity of manufacture. The problem of supporting the inner end of the force transmitting member is a particularly difficult one where the fluid inlet for the actuating device extends laterally of the force transmitting member and when it is not desired to provide any access openings into the pressurized fluid chamber in the device.

Also, with actuators of the type described, there is a tendency of the force transmitting member to absorb some of the pressurized liquid normally used in such actuators thus causing a volumetric expansion or swell of the force transmitting member. Where this swell is excessive, with regard to the size of the fluid chamber in the device, it can cause movement of the actuator independently of change of pressure in the fluid acting on the force transmitting member. Further, it is often necessary to fill the fluid chamber of the actuating device, and any associated fluid containing means, under reduced temperature conditions. This is particularly true when the liquid fill is of a type having a relatively high thermal coefficient of volumetric expansion, such as in the case where the actuator is to be used as a temperature responsive actuator. If this procedure is not followed, when the temperature of the liquid fill falls below room temperature, voids may occur in the pressurized fluid chamber device resulting in malfunction or inoperativeness of the device at the reduced temperature.

Accordingly, it is a primary object of the present invention to provide a novel and improved method of manufacturing a pressure responsive actuating device of the general type described which will facilitate the molding of the force transmitting member and will contribute to an increase in ease and economy of manufacture.

It is another object of the present invention to provide a novel and improved pressure responsive actuator of the general type described which may be filled with temperature responsive fluid at room temperature, while at the same time will be fully operative at temperatures substantially below room temperature.

It is further an object of this invention to provide a novel and improved pressure responsive actuating device of the type described which, even though the force transmitting member may swell due to contact with a liquid, will provide accurate response through the normal range of swell of the force transmitting member.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 1:
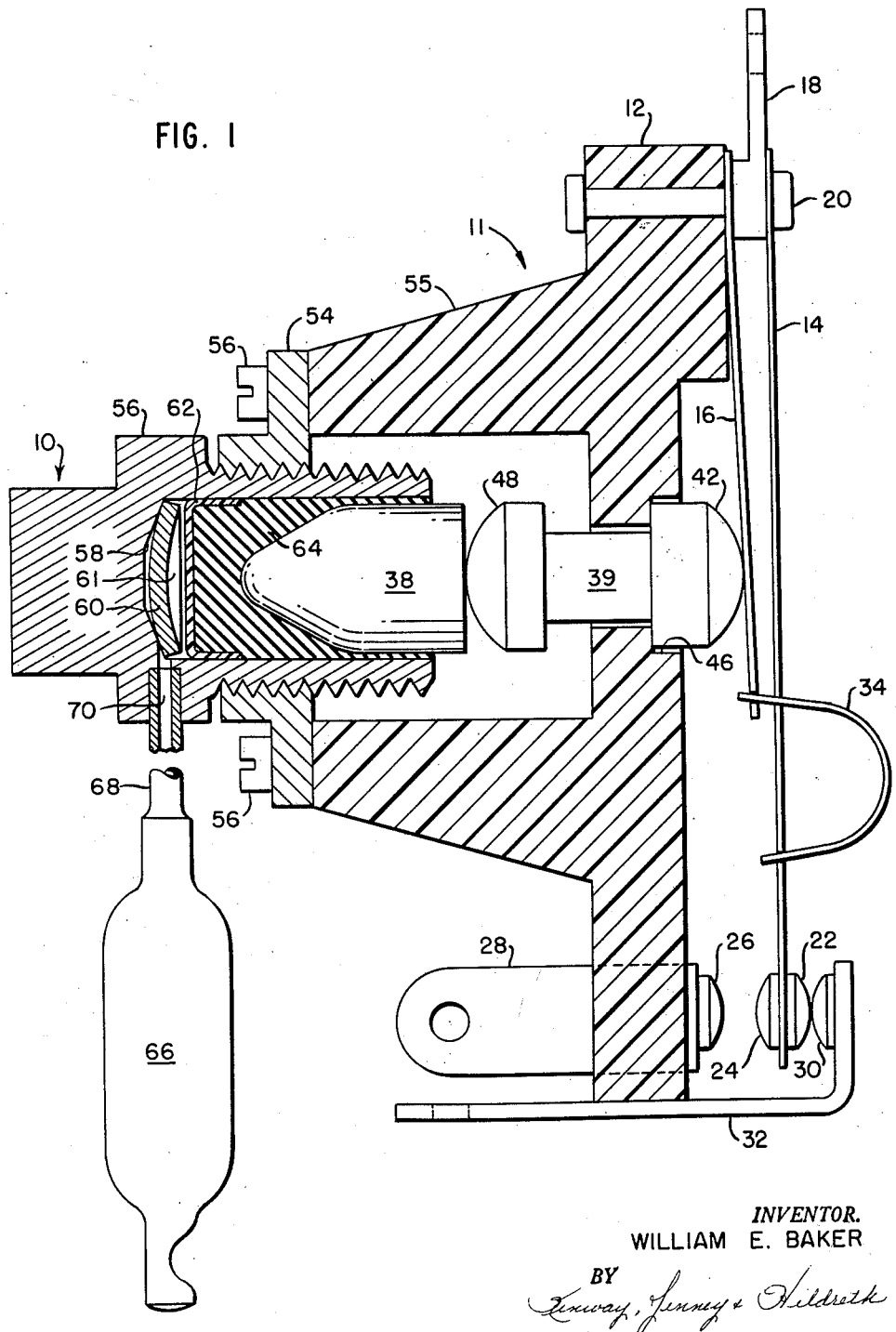
FIG. 1 is a cross sectional view of a snap action electrical switch actuated by a pressure responsive actuating device embodying the present invention.

With reference to the drawings, and particularly FIG. 1, a pressure responsive actuating device embodying the present invention is generally indicated at 10 and is shown in association with a snap acting electrical switch assembly 11 comprising a body or frame 12. In the specific embodiment shown, the body 12 is fabricated from a suitable electrically insulating material such as phenolic resin. Mounted on the switch body 12 are a pair of resilient cantilever supported elongated metal leaves 14 and 16. The leaves 14 and 16 are mounted at one end by means of a terminal lug 18 which is engaged between the ends of the leaves to space the leaves apart. The terminal 18 and leaves 14 and 16 are secured to the body 12 by suitable means such as the rivet 20. The free end of the leaf 14 mounts a pair of contacts 22 and 24 on the opposite sides thereof. The contact 24 is engageable with a fixed contact 26 mounted on a terminal 28 which is suitably fixed to the switch body. The contact 22 is engageable with a contact 30 mounted on a terminal 32 which is also suitably fixed to the switch body. The outer end of the leaf 16 is connected to the leaf 14 intermediate its ends by a resilient snap yoke 34. As will be apparent to those skilled in the art, the switch construction described above has an over-center toggle snap action so that either the contacts 22 and 30 will be engaged as shown in FIG. 1, or when the free end of the leaf 16 is moved sufficiently toward the leaf 14, the yoke 34 will snap overcenter to engage the contacts 24 and 26.

Movement of the switch leaf 16 toward the leaf 14 is accomplished by a movable actuating member 38 of the pressure responsive device 10 and a plunger 39 arranged coaxially of the actuating member 38 engaged between the actuating member 38 and the leaf 16. As can be seen in FIG. 1 the plunger 39 is slidably received in an aperture 40 in the switch body for movement generally at right angles to the general plane of the leaf 16. The plunger 39 is provided with an enlarged rounded end portion 42 which is partially received within a counterbore 46 of the aperture 40 and which is bearing upon the leaf 16. The other end of the plunger 39 is also provided with an enlarged rounded end portion which bears upon the outer end of the actuating member 38 of the pressure responsive actuating device 10.

The pressure responsive actuating device 10 further comprises a cylindrical housing or body 52. The housing 52 is externally threaded and is threadably engaged within a mounting plate 54 which is mounted by cap screws 56 on the outer end of an annular projection or boss 55 formed integrally with the switch body 12. The housing 52 is provided with an elongated cylindrical recess extending coaxially of the threaded portion of the housing and having a generally concave bottom wall 58. Loosely received within the recess in the housing is a dished metal disc 60. The convex side of the disc 60 is disposed next adjacent the concave bottom wall 58 of the recess in the housing. As can be seen from FIG. 1, when the disc 60 is bottomed in the recess in the housing 52, there will be a space between the center portion of the convex side of the disc and the bottom wall of the housing. Slidably disposed within the recess in the housing 52 and next adjacent the concave side of the disc 60 is a non-metallic cup-shaped insert 62. As can be seen in FIG. 1, the bottom wall of the insert 62 is spaced from the disc 60. The insert 62 is fabricated from a suitable resiliently deformable material such as nylon or a tetrafluoroethylene polymer. Also disposed within the recess in the housing 52 is a force transmitting member or body 64 which is molded into the recess in the housing and into the cup-shaped insert 62 in bonded relation to the side wall of the housing recess. The force transmitting member 64 is fabricated from a suitable elastomeric material such as rubber or rubber substitute and is provided with a cavity extending coaxially of the recess in the housing 52 and opening outwardly of the open end of the housing recess. Slidably and coaxially received with the cavity in the force transmitting member 64 is an actuating member or pin 38.

As is known to those skilled in the art, when a force is exerted on the inner end of the force transmitting member or, in other words on the bottom of the cup-shaped insert 62, the attendant volumetric displacement of the force transmitting member, which is substantially incompressible, will cause a corresponding volumetric displacement of the actuating pin 38 in a direction outwardly of the housing 52. In the specific embodiment shown, the force applied to the inner end of the force transmitting member is supplied by a suitable temperature responsive fluid, such as ethylene glycol, which is contained within a bulb 66 which is connected to a fluid inlet passage 70 in the housing 52 by a capillary 68. As shown in FIG. 1, the fluid inlet passage 70 registers at its inner end at least partially with the perimeter of the disc 60. The inlet 70 is in communication with a fluid chamber 61 formed by the concave side of the disc and adjacent end of the cup-shaped insert 62 in cooperation with the side wall of the recess in the housing 52. Also, as can be seen from FIG. 1, the fluid inlet 70 which extends laterally of the disc 60 and thus the recess in the housing 52, communicates at least in part with the under convex side of the disc when the disc is bottomed in the housing. The temperature responsive fluid fills the chamber 61, capillary 68, and space between the disc 60 and bottom of the housing recess.

In the operation of the device shown in FIG. 1, the bulb 66 will normally be located in a position remote from the remainder of the device wherein it will sense a control temperature. Changes in temperature of the fluid filling the fluid chamber of the actuating device, the capillary 68, and the bulb 66 will cause the cup-shaped insert 62 to be deformed toward the actuating pin 38, thus resulting in an attendant movement of the actuating pin 38 out of the housing 52 so as to move the plunger 39 to the right, as viewed in FIG. 1. Upon sufficient increase in temperature, the plunger 39 will be moved sufficiently to effect a snap action of the switch to engage the contacts 24 and 26.

The housing 52 is preferably threaded inwardly of the boss 55 sufficiently to provide that the spring leaf 16 will exert a biasing force on the plunger 39, and thus the actuating pin 38, to preload the actuating pin inwardly of the housing 52. This biasing of the actuating pin assures that when the temperature of the thermostatic liquid decreases, the actuating pin 38 will be moved inwardly of the housing 52 so as to cause a volumetric displacement of the force transmitting member 64 corresponding to the decrease in volume of the fluid fill. It will, of course, be understood that other suitable biasing means might be provided for the pin 38 in order to obtain the desired preloading of the pin. Also, it will, of course, be understood that other temperature sensing means might be utilized in place of the bulb 66 and further, that a suitable variable pressure source of fluid might be substituted for the temperature sensitive means shown in FIG. 1, where it is desired to actuate the device 10 in response to changes in a control pressure rather than changes in a control temperature. In either cases of a temperature sensitive system or pressure sensitive system, the movement of the pin will be governed by the changes in pressure of the fluid in the chamber formed by the disc 60 and cup 62, so that it can be seen that the device 10 is, in either case, fluid pressure responsive and is thus referred to generally as a fluid pressure responsive actuator.

Figure 2:
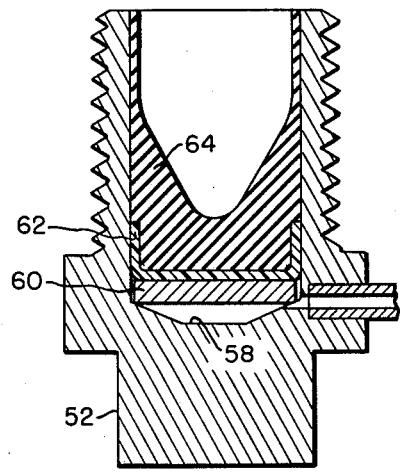
FIG. 2 is a longitudinal cross sectional view of the pressure responsive device of FIG. 1 illustrating one step of the novel method of this invention.

The actuator of the present invention is fabricated in the following manner. First, the housing 52 is bored and threaded, these operations being relatively rapid and inexpensive due to the simplicity of shape. The lateral passage for the capillary 68 is also bored at this time. Next, the disc 60 is inserted into the recess in the housing. As shown in FIG. 2, the disc is at this time flat. The disc is bottomed in the recess in the housing 52, and the cup-shaped insert 62 is inserted into the recess and bottomed on the disc. A mold pin (not shown), having an external configuration identical with that of the actuating pin 38, is then inserted coaxially into the housing recess. The mold pin is provided with a suitable internal passage to permit the injection of liquid uncured rubber, or other suitable elastomeric material, into the housing recess. Prior to the molding of the force transmitting member 64, the side wall of the housing recess is coated with a suitable bonding material. Also, the external surface of the mold pin is suitably lubricated, such as with a silicone grease, to permit easy withdrawal after the molding operation. The elastomeric material forming the force transmitting member is then injected into the housing recess at pressures as high as 2000 to 3000 p.s.i. During this high pressure molding operation, the cup-shaped insert 62 tends to be deformed inwardly of the housing recess. However, the flat disc 60 provides a support for the cup-shaped insert and effectively prevents any distortion of the cup. Thus, the disc 60 provides the necessary support for the inner end of the force transmitting member during the high pressure molding thereof. After the force transmitting member has been molded in the housing, the actuator is heated to cure the elastomeric transmitting member and bond it to the housing. The cup-shaped insert 62 is not bonded to the side wall of the housing recess, and the force transmitting member may or may not be bonded to the inside of the cup-shaped insert.

Figure 3:
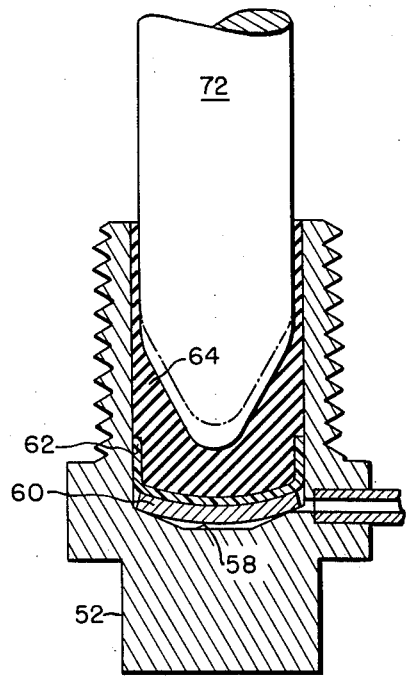
FIG. 3 is a longitudinal cross sectional view of the pressure responsive actuating device of FIG. 1 illustrating another step of the novel method of this invention.

Subsequently, as shown in FIG. 3, a suitable mandrel 72 is inserted into the cavity in the force transmitting member 64 and moved inwardly of the housing recess so as to permanently deform the disc 60 toward the inner end of the housing recess using the force transmitting member 64 as a deformable rubber die. The disc 60 is fabricated from any suitable permanently deformable material, preferably a metal, so as to be sufficiently rigid to provide the required support of the insert 62 during molding of the force transmitting member while later it may be permanently deformed, as described. The disc 60 is not deformed sufficiently so that the bottom convex surface is in engagement with the concave bottom wall 58 of the housing recess. After the mandrel 72 is removed, the resilient force transmitting member 64 and insert 62 will return to their original shapes, thus providing the desired space between the cup-shaped insert 62 and disc 60 as shown in FIG. 1.

Accordingly, it can be seen that in the method of this invention, the disc 60 forms the support of the inner end of the force transmitting member during the pressure molding thereof and need not be removed after the molding operation. Thus, there is eliminated any need for special complex accessory equipment to provide support of the force transmitting member during the pressure molding thereof. The method of this invention obviously offers a particular advantage where the pressure responsive actuating device has a side inlet opening, as shown in the drawings. Such a structure would make it difficult, to say the least, to provide a support for the bottom of the force transmitting member during the molding thereof where the deformable disc 60 of this invention not utilized in the method of this invention.

With certain materials and liquids used for the force transmitting member and liquid fill of the pressure responsive device, there is a tendency for the force transmitting member to absorb a certain amount of the liquid resulting in a substantial volumetric expansion in the force transmitting member. This expansion or swell may be as high as 5%. If this swell of the force transmitting member is more than necessary to fill the chamber 61, it will be apparent that it will cause outward movement of the actuating pin 38 independently of any increase in the control pressure of the fluid in the chamber 61. Accordingly, the disc 60 is deformed inwardly of the housing at a distance sufficient to assure that the chamber 61 will have a volume which is substantially greater than the normal swell experienced with the particular materials used for the force transmitting member and liquid fill. With prior pressure responsive actuating devices of the type described, it might be possible that the force transmitting member would swell sufficiently to close the side inlet opening to the housing thus rendering the device inoperative. However, as will be apparent from FIG. 1, in accordance with the invention, the inner end of the inlet passage 70 communicates at least in part with the bottom convex surface of the deformed disc 60. Thus, even if the force transmitting member should swell or be otherwise displaced to a point where the chamber 61 is filled, the inner end of the fluid inlet 70 will still be open and will communicate with the bottom of the disc 60 thus assuring continued operation of the device.

With previous pressure responsive devices having a temperature responsive liquid fill, it is a common practice to load the thermostatic fill liquid under reduced temperature conditions. In this manner, any later reduction in ambient temperature of the device below room temperature will not result in voids in the liquid fill containing spaces. Such voids could cause erroneous operation or inoperativeness of the device. In the pressure responsive device of this invention, the thermostatic fill is loaded at room temperature. Subsequently, the pin 38 is preloaded inwardly of the housing to cause an initial preloading of the force transmitting member and pressurizing or preloading of the thermostatic fill. Accordingly, if the control temperature later falls to below room temperature, the initial preloading of the thermostatic fill will assure continued accurate operation of the device. In this connection, the disc 60 is deformed inwardly of the housing sufficiently to assure that the fill space 61 has a volume which is large enough to accommodate this initial preloading of the device as well as any normal swell of the force transmitting member where the force transmitting member is of a material subject to swell on contact with liquid. In the specific embodiment shown, the preloading of the fill is accomplished by the spring leaves when the housing 52 is threaded inwardly of the boss 55 on the switch body. As will be apparent to those skilled in the art, other suitable biasing means may be utilized in place of the leaves 14 and 16 to provide the desired preloading of the fill liquid particularly where the device is to be in association with apparatus other than the particular switch shown.

Inasmuch as many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language in the following claims is intended to cover all of the generic and specific features of the invention herein described and all statements of the scope of the invention which, as a matter of language might be said to fall therebetween.

I claim:

1. A method of manufacturing a pressure responsive actuator of the type described, comprising the steps of providing a housing having a recess, locating a permanently deformable plate in said recess with the plate supported by the housing with at least a portion of the plate spaced from the bottom of said recess, pressure molding to a permanent shape a resilient force transmitting member in said recess at a pressure insufficient to deform said plate whereby the plate will provide support for the bottom of the force transmitting member during molding thereof, and subsequently deforming the plate toward the bottom of said recess using the molded force transmitting member as a deformable die, said force transmitting member returning to said permanent shape after the plate is deformed.

2. A method of manufacturing a pressure responsive actuator of the type described, comprising the steps of providing a housing having a recess, locating a permanently deformable plate in said recess with the plate supported by the housing with at least a portion of the plate spaced from the bottom of said recess, locating a resiliently deformable cup-shaped member in said recess in supporting engagement with said plate, pressure molding a resilient force transmitting member in said recess and cup-shaped member at a pressure insufficient to deform said plate whereby the plate will provide support for the bottom of said cup-shaped member and thus the bottom of the force transmitting member during molding of the force transmitting member, and subsequently deforming the plate toward the bottom of said recess using the molded force transmitting member as a deformable die.

3. A method of manufacturing a pressure responsive actuator of the type described, comprising the steps of providing a housing having a recess provided with a generally concave bottom, loosely locating a permanently deformable flat plate in said recess with the plate being supported by the housing adjacent the bottom of said recess and with the general plane of the plate extending at right angles to the axis of said recess, pressure molding to a permanent shape a resilient force transmitting member in said recess at a pressure insufficient to deform said plate whereby the plate will provide support for the bottom of the force transmitting member during molding thereof, and subsequently deforming the plate toward the bottom of said recess using the molded force transmitting member as a deformable die, said force transmitting member returning to said permanent shape after the plate is deformed.

4. A method of manufacturing a pressure responsive actuator of the type described, comprising the steps of providing a housing having a recess with a generally concave bottom portion, loosely locating a permanently deformable flat plate in said recess with the plate being supported by the housing in overlying relation to the bottom of the recess, molding in the recess in the housing, a resilient force transmitting member having a recess extending coaxially of the recess in the housing and utilizing said plate as a support for the bottom of the force transmitting member during the molding thereof, and subsequently inserting a mandrel into the recess in said force transmitting member and exerting a force thereon directed inwardly of said recess in the housing to deform said plate toward the bottom of said recess in the housing utilizing the force transmitting member as a deformable die.

5. A method of manufacturing a pressure responsive actuator of the type described, comprising the steps of providing a housing having a recess with a generally concave bottom portion, loosely locating a permanently deformable flat plate in said recess with the plate being supported by the housing in overlying spaced relation to at least a portion of the bottom of the recess, locating a resiliently deformable cup-shaped member slidably in said recess and in supporting engagement with said plate, pressure molding in said recess and in said cup-shaped member a resilient force transmitting member having a recess extending coaxially of the recess in the housing and utilizing said plate as a support of the bottom of said force transmitting member during the molding thereof, and subsequently inserting a mandrel into the recess in said force transmitting member and exerting a force thereon directed inwardly of said recess in the housing to deform said plate toward the bottom of said recess in the housing utilizing the force transmitting member as a deformable die.

6. A method of manufacturing a pressure responsive actuator of the type described, comprising the steps of providing a housing having a cylindrical recess with a concave bottom wall, loosely locating a deformable initially flat metal disc in said recess with the marginal edges of the disc bottomed on said bottom wall, locating a resiliently deformable cup-shaped member slidably in said recess and bottom on said disc, pressure molding in said recess at a pressure insufficient to deform said disc an elastomeric force transmitting member having a recess extending coaxially of the recess in the housing, and subsequently inserting a mandrel into the recess in said force transmitting member and exerting a force thereon directed inwardly of said recess in the housing to permanently deform said disc toward the bottom of said recess in the housing utilizing the force transmitting member as a deformable die.

7. In a pressure responsive actuator of the type described, a housing having a recess provided with a generally concave bottom portion, a resilient force transmitting member molded in said recess and bonded to the side walls of said recess, the inner end of said force transmitting member being spaced from the bottom of said recess, and a rigid convexo-concave plate-like member supported in said recess by engagement with the housing between the inner end of said force transmitting member and said bottom portion of said recess, the concave side of said plate-like member facing the inner end of said force transmitting member and being spaced therefrom to provide a fluid chamber.

8. In a pressure responsive actuator of the type described, a housing having a recess provided with a generally concave bottom portion, a deformable cup-shaped insert received in said recess, a resilient force transmitting member molded in said recess, the inner end of said force transmitting member being received in said cup-shaped insert, and a rigid convexo-concave plate-like member supported in said recess between the inner end of said force transmitting member and said bottom portion of said recess, the concave side of said plate-like member facing the inner end of said force transmitting member and being spaced therefrom to provide a chamber for pressurized fluid, the housing further being provided with a fluid inlet passage extending laterally of said recess and opening into said recess adjacent said plate member and in communication with said chamber for pressurized fluid.

9. In a pressure responsive actuator of the type described, a housing having a recess provided with a generally concave bottom portion, a resilient force transmitting member molded in said recess and bonded to the side walls of said recess, the inner end of said force transmitting member being spaced from the bottom of said recess, a resilient cup-shaped member slidably received in said recess and receiving the inner end portion of said force transmitting member, and a dished disc loosely received in and bottomed in said recess in engagement with the housing with its convex side facing the bottom of said recess and spaced at least in part from the bottom of said recess, the concave side of said disc cooperating with the housing and bottom of the cup-shaped member to provide a fluid chamber.

10. In a pressure responsive actuator of the type described, a housing having a recess provided with a generally concave bottom portion, a resilient force transmitting member molded in said recess and bonded to the side walls of the recess, a resilient cup-shaped member slidably received in said recess and receiving the inner end portion of said force transmitting member, the inner end portion of said force transmitting member and a deformed dished plate-like member disposed in said recess in engagement with the housing between the bottom of said cup-shaped member and said bottom portion of said recess, said plate-like member having a concave side facing said cup-shaped member and cooperating therewith to provide a chamber for a liquid, said force transmitting member being fabricated from a material which has a tendency to swell when contacted with a liquid, said chamber having a volume substantially greater than the maximum increase in volume of the force transmitting member due to contact of the force transmitting member and a liquid.

11. A pressure responsive actuator comprising, a housing having a recess provided with a generally convex bottom wall, a dished disc loosely received in said recess with its convex side bottomed in said recess with the center portion of said convex side spaced from said bottom wall, a resiliently deformable cup-shaped member slidably received in said recess with its bottom disposed next adjacent said disc, said disc and the bottom of said cup-shaped member cooperating to provide a fluid chamber, a resilient force transmitting member molded in said recess and cup-shaped member and bonded to the side walls of said recess, said force transmitting member having a cavity extending coaxially of the recess in the housing from the end of the force transmitting member opposite said disc and terminating in spaced relation to the bottom of said cup-shaped member, an actuating member slidably received in said cavity in the force transmitting member, and a fluid inlet in said housing communicating with said fluid chamber.

12. A pressure responsive actuator as described in claim 11 wherein said chamber is filled with a fluid having the characteristic of undergoing volume change in response to temperature change of the fluid, means urging said actuating member toward said disc and effecting a preloading of said liquid sufficient to eliminate voids therein when the temperature of the liquid is reduced a predetermined amount below the temperature of the liquid when it was loaded into the actuator.

13. A pressure responsive actuator as described in claim wherein said fluid inlet extends laterally of the recess in said housing and registers at its inner end at least in part with the underside of said disc.

14. A pressure responsive actuator as described in claim 13 wherein said force transmitting member is subject to volumetric expansion when in contact with a liquid and wherein the volume of said chamber is greater than the normal volumetric expansion of the force transmitting member when in contact with a liquid.

References Cited in the file of this patent

UNITED STATES PATENTS

| | | |
|---|---|---|
| 2,158,044 | Haller | May 9, 1939 |
| 2,326,096 | Dillman | Aug. 3, 1943 |
| 2,498,489 | Haggart | Feb. 21, 1950 |
| 2,593,238 | Albright | Apr. 15, 1952 |
| 2,684,502 | Paulve | July 27, 1954 |

FOREIGN PATENTS

| | | |
|---|---|---|
| 531,280 | Great Britain | Jan. 1, 1941 |

UNITED STATES PATENT OFFICE
CERTIFICATE OF CORRECTION

Patent No. 3,078,876                        February 26, 1963

William E. Baker

It is hereby certified that error appears in the above numbered patent requiring correction and that the said Letters Patent should read as corrected below.

Column 7, line 28, for "of", first occurrence, read -- for --; column 8, line 72, after "claim" insert -- 11 --.

Signed and sealed this 24th day of September 1963.

(SEAL)
Attest:

ERNEST W. SWIDER
Attesting Officer

DAVID L. LADD
Commissioner of Patents